May 24, 1966 T. B. HORGAN 3,253,158

MULTISTABLE CIRCUITS EMPLOYING PLURALITY OF PREDETERMINED-THRESHOLD CIRCUIT MEANS

Filed May 3, 1963 4 Sheets-Sheet 1

INVENTOR

THOMAS B. HORGAN

BY John C Black

ATTORNEY

United States Patent Office 3,253,158
Patented May 24, 1966

3,253,158

MULTISTABLE CIRCUITS EMPLOYING PLURALITY OF PREDETERMINED-THRESHOLD CIRCUIT MEANS

Thomas B. Horgan, Endwell, N.Y., assignor to International Business Machines Corporation, New York, N.Y., a corporation of New York Filed May 3, 1963, Ser. No. 277,739
11 Claims. (Cl. 307—88.5)

This invention relates generally to improvements in multistable circuits and more particularly to circuits which have several D.C. stable states.

In data processing apparatus, multistable circuits are extensively used in devices such as memories, ring circuits and shift registers. In some applications, it is not required that the information be held within the multistable circuit for an appreciable length of time; and it is acceptable therefore to have merely an A.C. stable circuit. However, in many applications, it is required that data be held in the bistable devices for an extended period of time. In such cases it is necessary that the multistable device be D.C. stable, that is, it must retain its state so long as D.C. power is applied.

In the most common multistable circuits, for example, the Eccles-Jordan flip-flop, two active devices such as transistors, are required for each bistable stage.

It is therefore a primary object of the present invention to provide improved D.C. multistable circuits in which only one active device per stage is required.

A feature of the present invention is the achievement of D.C. multistable operation by the interconnection of threshold logic blocks.

These objects are achieved in the preferred embodiment of the present invention by the provision of a generalized threshold logic block (inverting type). Such a block is characterized by N inputs (binary variables) and a threshold value T. The output of the block is also a binary variable assuming one level when the total of the applied inputs is less than T and the opposite level when the total of the applied inputs is greater than or equal to T. The general method of interconnecting a plurality of such blocks to achieve multistable operation is the selection of $N+1$ blocks connected in a ring, that is, each block drives one input of the next block. Each block then has $N-1$ unconnected inputs. These remaining inputs are connected to the outputs of the remaining blocks, whereby each block drives the one input of the remaining N blocks. Thus each of $N+1$ blocks is driven from the other N blocks. The final step is to assign a threshold value T. It will be appreciated that when $T=1$ an "OR" input circuit is provided, or the block provides an inverting "OR" or "NOT AND" function. When $T=N$ an "AND" circuit is provided in the input, and the block provides an inverting "AND" or "NOT OR" function.

The threshold selected determines the number of stable states achieved and in a practical embodiment any threshold from 1 to N may be used. Thresholds of unity and N are, as indicated above, easily realized with primitive "AND" and "OR" input circuits and N-stable operation with N blocks is achieved. When T is greater than unity but less than N, the number of stable states is greater than the number of blocks utilized, for example, six stable operation can be achieved with 4 blocks and ten stable operation with 5 blocks when $T=2$.

When the multistable circuits of the present application are used to store coded data (e.g. 2 out of 5 code), parity checking is not required because the multistable circuit must always assume a stable condition with the required number of "1" and "0" bits.

A more specific object of the present invention is the provision of an improved three-stable state circuit.

Another specific object of the present invention is the provision of an improved six-stable state circuit.

Another specific object of the present invention is the provision of an improved five-stable state ring circuit.

Another specific object of the present invention is the provision of improved ten-stable state circuits.

The foregoing and other objects, features and advantages of the invention will be apparent from the following more particular description of preferred embodiments of the invention, as illustrated in the accompanying drawings.

The present invention is directed to the general method and means of interconnecting a plurality of threshold logic blocks to achieve a plurality of D.C. stable state circuits. The number of stable states which can be achieved by the various circuits is compactly represented by Pascal's triangle, partially shown in FIG. 1. The horizontal rows in the triangle indicate the number of blocks used as well as the number of inputs (N) to each block. The upper diagonal row indicates the threshold (T) values which are assigned to each of the blocks. The parallelograms encompass numerals which identify the number of stable states achieved by circuits having various values of N and T.

Circuits with threshold values of zero and $N+1$ are of no consequence; however, they are assigned the appropriate "unity" numeral for the purpose of illustrating how the number of stable states in the practical circuits are arrived at. That is, in order to determine the number in any parallelogram we merely calculate the sum of the numbers in the two parallelograms immediately above the particular parallelogram. Although the table has been carried out only to six blocks in FIG. 1, it will be appreciated that it can be further extended by utilizing the above procedure to determine the number of the stable states.

Figure 1:
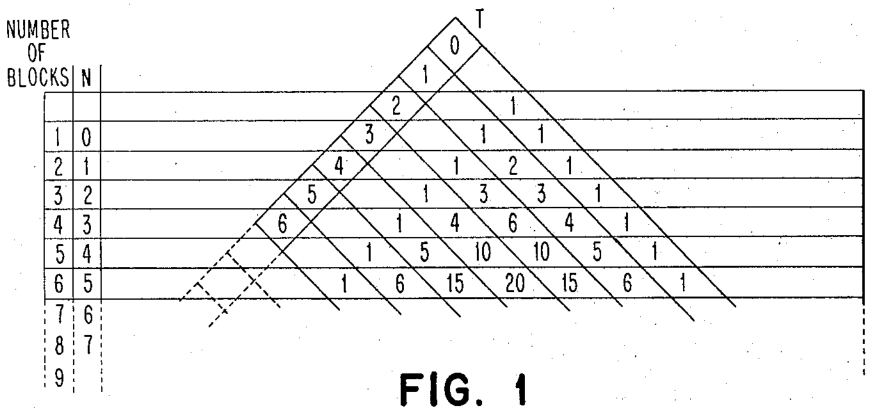
FIG. 1 is a chart illustrating characteristics of circuits encompassed by the present invention.

Certain of the circuitry represented by FIG. 1 is known, e.g. the two stable device is the conventional D.C. stable multivibrator. However, the realization of the generalized concept and relationships is, so far as is known, new.

Figure 2:
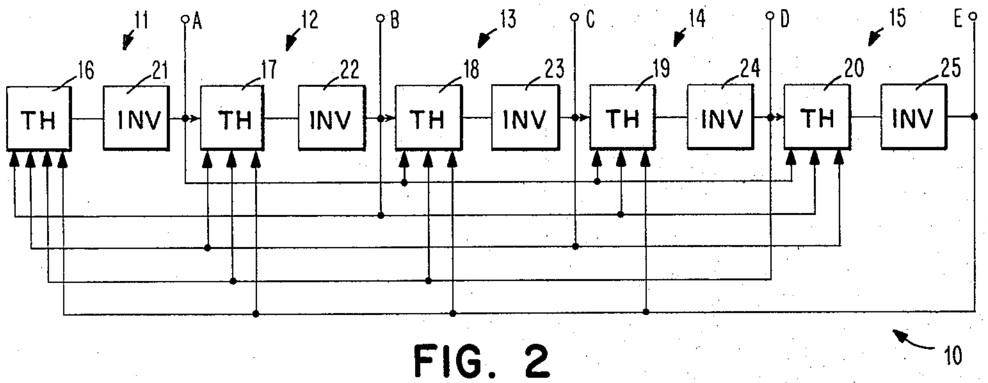
FIG. 2 is a diagrammatic illustration of one generalized embodiment of the invention.

In the diagrammatic illustration of FIG. 2, the multistable device 10 comprises five stages 11–15 of threshold logic blocks (inverting type). The stages 11–15 preferably comprise threshold devices 16–20 and inverters 21–25. Each threshold device has four inputs which are coupled to the outputs of the inverters of the other stages. Thus the inverter 21 has an output A, and the threshold device 16 has four inputs coupled to the outputs B, C, D and E of the inverters 22–25, inclusive. The terminals A–E may also be utilized as inputs to the device 10. With particular reference to FIG. 1, it can be seen that the generalized multistable circuit 10 of FIG. 2 may be operated as a five-stable device when the threshold value is set at "1" or "4" and as a ten-stable device if the threshold is set at "2" or "3."

Figure 3:
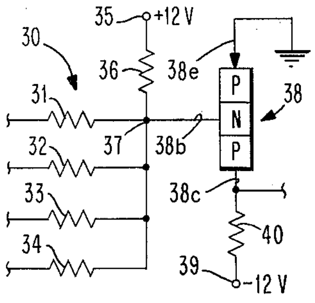
FIG. 3 is a fragmentary schematic diagram of a circuit which can be utilized in one species of the generalized embodiment of FIG. 2.

FIG. 3 shows schematically one stage for operating the circuit of FIG. 10 as a ten-stable device. The stage comprises a threshold device 30 including four input resistors 31, 32, 33 and 34 which are coupled to a positive potential terminal 35 by way of a resistor 36. The junction 37 between the resistors 31–34 and resistor 36 is connected to the base terminal **38*b* of a transistor inverter 38. The emitter terminal 38*e* of the transistor is connected to ground potential, and the collector terminal 38*c* is coupled to a negative potential terminal 39 by way of a resistor 40. In one form, the multistable device 10** of FIG. 2 comprises five stages such as that shown in FIG. 3 with the input resistors coupled to the outputs of the inverters of the other stages.

For purposes of illustration, assume that each of the resistors 31–34 has a value of 6,000 ohms and the resistors 36 and 40 each have a value of 2,000 ohms. Each of the other inverters will apply either a negative 12 volt potential to the respective input resistor 31–34 by way of the collector load resistor corresponding to resistor 40 or ground potential by way of the emitter-collector path.

If ground potential is applied to two of the input resistors and the negative 12 volt potential is applied to the other two input resistors, the resulting potential at junction 37 will be positive to turn off the transistor 38. However, if three of the inputs have negative 12 volt potentials applied thereto and only one of the input resistors has ground potential applied thereto, the potential at junction 37 will be negative to turn the transistor 38 on.

Therefore, if each of the stages 11–15 of FIG. 2 comprises a circuit such as that of FIG. 3, three of the five stages will have nonconducting transistors while two of the stages will have conducting transistors. This arrangement can be utilized as a threshold 2 device by arbitrarily assigning a logic 1 when a transistor is on and a logic 0 when the transistor is off. The device has a threshold $T=3$ in the event that a logic 1 is assigned to a stage which has a nonconducting transistor and a logic 0 to a stage which has a conducting transistor. Alternatively, the selection of potential polarities and transistor types may be utilized to set T at 2 or 3 in a well-known manner.

Table I set forth below illustrates the ten stable states when the circuit of FIG. 2 has a threshold equal to 2. The states which the circuits of FIG. 2 can assume when the threshold is equal to 3 is the complement of Table I. It is readily apparent that these circuits may be used for storing data represented by 2 out of 5 codes and 3 out of 5 codes.

*Table I*

| Output Terminals | A | B | C | D | E |
|---|---|---|---|---|---|
| State: | | | | | |
| 1 | 1 | 1 | 0 | 0 | 0 |
| 2 | 1 | 0 | 1 | 0 | 0 |
| 3 | 0 | 1 | 1 | 0 | 0 |
| 4 | 0 | 1 | 0 | 1 | 0 |
| 5 | 0 | 0 | 1 | 1 | 0 |
| 6 | 0 | 0 | 1 | 0 | 1 |
| 7 | 0 | 0 | 0 | 1 | 1 |
| 8 | 1 | 0 | 0 | 1 | 0 |
| 9 | 1 | 0 | 0 | 0 | 1 |
| 10 | 0 | 1 | 0 | 0 | 1 |

Figure 4:
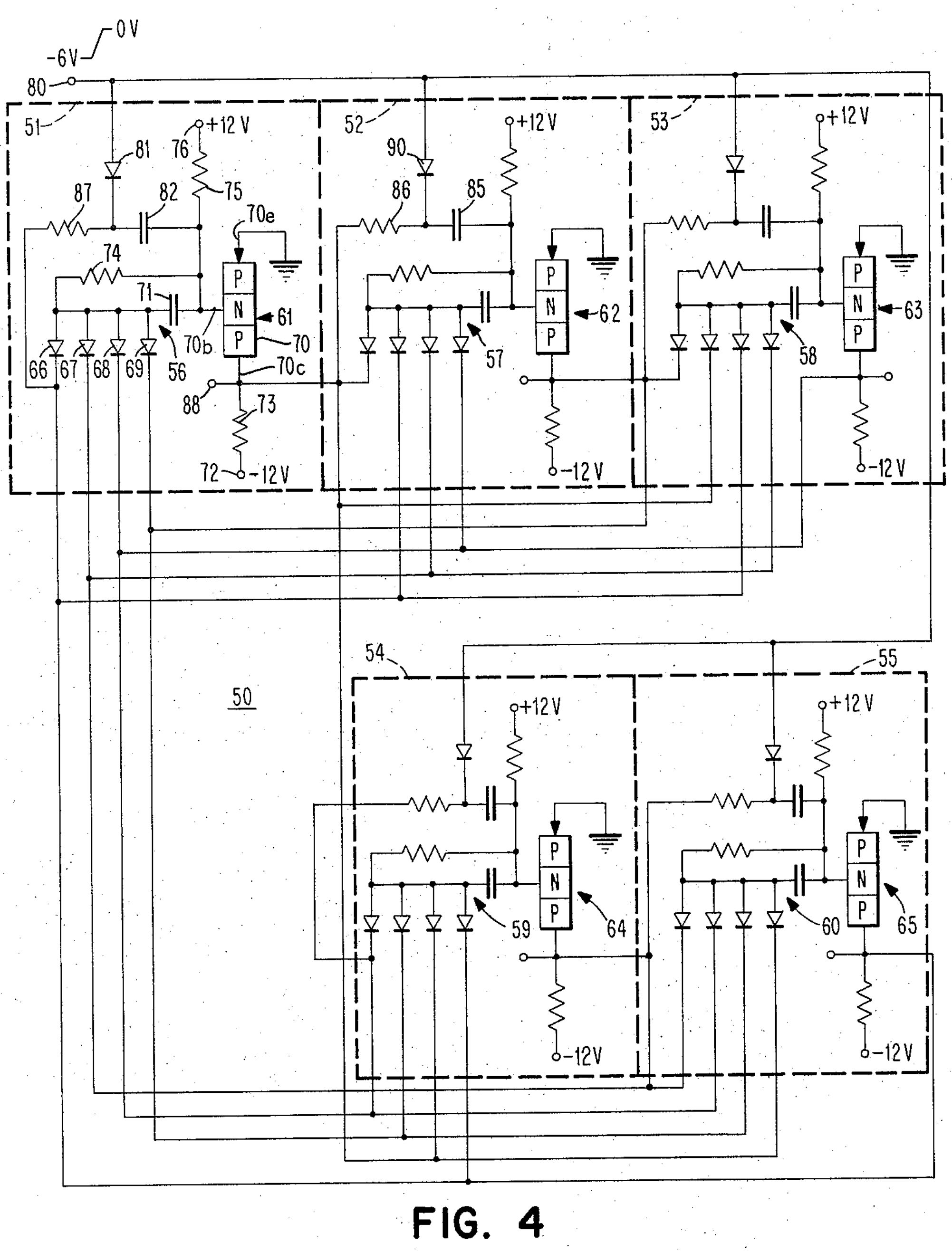
FIGS. 4 and 5 are schematic diagrams of five stage ring circuits illustrating other species of the more general representation of FIG. 2.

FIG. 4 is a schematic diagram of a five-stable species of the device illustrated generally in FIG. 2 where the threshold value is equal to 1 or 4. The ring circuit 50 of FIG. 4 comprises five stages 51–55 of threshold blocks (inverting type). The stages 51–55 comprise threshold devices 56–60 and inverters 61–65, respectively.

The inverter 61 comprises a transistor 70. The threshold device 56 of stage 51 comprises four diodes 66–69 which have their anode terminals coupled to the base terminal **70*b* of the transistor 70 by way of a resistor 74. The emitter terminal 70*e* is grounded and the collector terminal 70*c* is coupled to a negative potential terminal 72 by way of a resistor 73. Capacitor 71** is added to serve the usual "speed-up" function.

Resistors 74 and 75 D.C. couple the anodes of the diodes 66–69 to a positive potential terminal 76 and to the base terminal **70*b*. An input terminal 80 adapted to receive positive-going advance pulses from a source (not shown) is coupled to the base terminal 70*b* of the inverter 61 by way of a diode 81 and a capacitor 82. The input terminal 80 is also connected to each of the inverters 62–65** by a similar diode, capacitor coupling.

The cathode terminals of the diodes 66–69 are connected respectively to the collector outputs of the inverters 65, 64, 63 and 62. In addition, the collector output of each inverter is coupled to the advance pulse input circuit of the next succeeding stage by way of a resistor for advancing the ring through its various states. Thus the collector **70*c* of the inverter 61 is coupled to an input capacitor 85 of the inverter 62 by way of a resistor 86. Similarly, the collector output of the inverter 65 is connected to the capacitor 82 by way of a resistor 87**.

When the inverter 61 is turned on, it will apply a ground potential to its output terminal 88 and to the inputs of the other inverters. When the inverter is turned off a negative 12 volt potential will be applied by way of the resistor 73 to the output terminal 88 and to the inputs of the other stages.

In one application, typical values for the resistors 74, 75, 87 and 73 are 5600 ohms, 62000 ohms, 5100 ohms and 910 ohms, respectively. The application of a negative 12 volt potential through any one of the diodes 66–69 will forward bias the transistor 70 into conduction. The transistor 70 will be cut off only when all of the inputs to the diodes 66–69 are at ground potential. As a result, only one transistor can be cut off in any stable state of the ring circuit and the other four transistors must be conducting. Thus, the threshold value T equals 1 if the negative 12 v. potential is considered a logic 1, and the threshold value $T=4$ if ground potential is considered a logic 1. Also the polarity of the diode inputs to each threshold device can be reversed to determine the threshold value in a well-known manner.

The advancement of the ring circuit will now be described in detail. Assume that the transistor 70 of the stage 51 is nonconducting and the other transistors are conducting. The negative potential at terminal 72 will be applied by way of resistors 73 and 86 to the capacitor 85 to charge the latter negatively. Since the potential applied to the terminal 80 is normally at −6 volts, the left hand plate of the capacitor 85 will be clamped at the −6 volt potential by the input diode 90. The capacitors corresponding to 85 in all other stages will not be charged negatively inasmuch as the collector terminals to which they are connected have ground potential applied thereto to reverse bias the diodes such as 81.

When a positive-going advance pulse is received at the terminal 80, it will be applied to the capacitor 85 by way of the diode 90. This positive-going pulse will be applied to the base terminal of the transistor inverter circuit 62 to turn the transistor off. When this transistor turns off, the negative 12 volt potential at its collector is applied by way of the diode 69 and the resistor 74 and capacitor 71 to the base terminal **70*b* of the transistor 70** to turn on the latter.

Similarly, when the next advance pulse is received the inverter 62 will be turned on and the inverter 63 will be turned off; and successive advance pulses will turn off inverters 64, 65, 61, etc.

Figure 5:
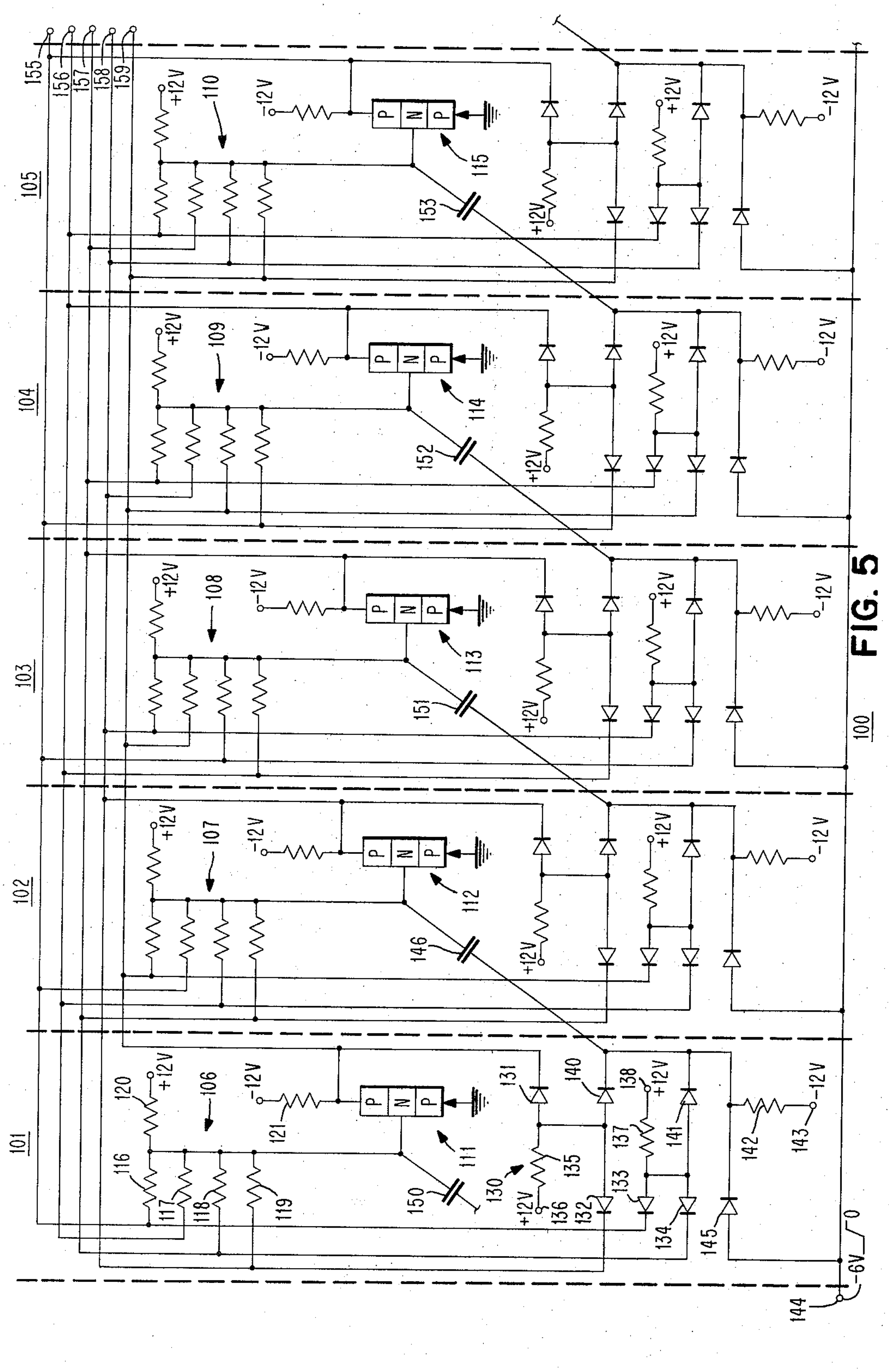

FIG. 5 is a schematic diagram of a ten-stable circuit connected in the form of an electronic ring for a two-out-of-five code. The five stages 101–105 comprise threshold devices 106 to 110 and inverters 111 to 115 similar to those in FIG. 3. Each of the threshold devices 106–110 includes four inputs, each of which is connected to the output of a respective one of the other inverters. In the example shown, the values of the resistors in the threshold device and in the collector circuit of each of the inverters are adjusted so that two of the transistors are always turned OFF and three are turned ON.

By way of example, in stage 101, the threshold device 106 comprises four resistors 116–119, each of which may be 6800 ohms and a bias resistor 120 which may be 11,000 ohms. The inverter 111 includes a resistor 121 connected in its collector circuit, the value of which may be 820 ohms. The values of the corresponding resistors in the other stages 102–105 are the same as those set forth above with respect to stage 101.

Each stage includes a logic circuit for controlling the advancement of the ring circuit through its various stable operating states. Thus the stage 101 includes a logic circuit 130 which comprises a diode 131 connected to the collector of the inverter 111; a second diode 132 connected to the collector of the inverter 112; a third diode 133 connected to the collector of the inverter 115 and a fourth diode 134 connected to the collector of the inverter 113. The diodes 131 and 132 together with a resistor 135 and a source terminal 136 comprise a negative OR circuit, and diodes 133 and 134 together with a resistor 137 and a positive source terminal 138 comprise a second negative OR circuit. The outputs of these OR circuits are connected to diodes 140 and 141 of an AND circuit including a resistor 142 and a negative source terminal 143. Advance pulses are applied to this AND circuit by way of the input terminal 144 and a diode 145.

Advance pulses are derived from a source (not shown) which is normally at a negative 6 volt potential and produces a positive-going rise to ground potential. The output of the AND circuit is connected to the base terminal of the inverter 112 in the next succeeding stage 102 by way of a coupling capacitor 146.

A logical advance circuit such as 130 is provided for each of the stages 102 to 105. In order to obtain a better understanding of the manner in which the ring 100 is advanced through its various stable states, reference is directed to the chart set forth below:

| State of Ring | States of Each Stage | | | | |
|---|---|---|---|---|---|
| | 101 | 102 | 103 | 104 | 105 |
| 1 | 1 | 1 | 0 | 0 | 0 |
| 2 | 1 | 0 | 1 | 0 | 0 |
| 3 | 0 | 1 | 1 | 0 | 0 |
| 4 | 0 | 1 | 0 | 1 | 0 |
| 5 | 0 | 0 | 1 | 1 | 0 |
| 6 | 0 | 0 | 1 | 0 | 1 |
| 7 | 0 | 0 | 0 | 1 | 1 |
| 8 | 1 | 0 | 0 | 1 | 0 |
| 9 | 1 | 0 | 0 | 0 | 1 |
| 10 | 0 | 1 | 0 | 0 | 1 |

Two simple logic rules are followed in order to generate the above sequence of operations to achieve the desired states:

(a) if logic "1's" are adjacent, advance the leading logic "1" to the right one position;

(b) if logic "1's" are nonadjacent, advance the trailing logic "1" to the right one position.

It will be noted that all columns in the chart above are symmetrical following a 1100000110 sequence. Hence the counting circuit is the same for each stage. It is assumed that a logical "1" corresponds to a transistor in the non-conducting or "OFF" condition with a negative output potential, and a logical "0" corresponds to a conducting transistor with a grounded output potential. As an illustrative example, consider the column for stage 102. The transistor inverter 112 should be "OFF" (logic 1) after the advance pulse if, at the time of the advance pulse, stages 102 and 103 have logic "1's" stored therein, stages 101 and 103 have logic "1's", stages 101 and 105 have logic "1's" or stages 102 and 105 have logic "1's". Under any one of the four above conditions the advance pulse should develop a positive leading edge for the base terminal of the inverter 112 by way of the capacitor 146 to turn the inverter OFF or hold it OFF. Analysis of column 102 of the chart indicates that a logical "1" should be produced or maintained in the stage 102 incident to the advance pulse generated when the ring 100 is in the states 2, 3, 9 and 10.

This may be expressed in Boolean form as follows:

$$(101)\ (103)+(102)\ (103)+(101)\ (105)+(102)\ (105)$$

or $$101\ (103+105)+102\ (103+105) \text{ or}$$

$$(101+102)\ (103+105)$$

Since the advance circuit 130 controls the application of turnoff pulses to the inverter 112 of stage 102 by way of the capacitor 146, the circuit 130 is connected to the various inverter outputs of stages 101–105 inclusive to satisfy the above Boolean expression. Thus the logic statement (101+102) is performed by diodes 131 and 132 and the logical statement (103+105) is performed by the diodes 133 and 134. The ANDing of these two logical statements is performed by diodes 140 and 141.

Control of the other stages by way of the capacitors 150, 151, 152 and 153 is achieved in the same manner as that described with respect to stage 102 and its advance logic circuit 130 of stage 101. The outputs of the ring circuit 100 are taken from terminals 155 to 159.

It will be appreciated that the ring 100 will handle a three-out-of-five code, for example, by arbitrarily assigning a logic "1" to the transistors when they are turned ON and a logic "0" to the transistors turned OFF. In this instance, logic "1" corresponds to ground potential level and a logic "0" by a negative potential.

Figure 6:
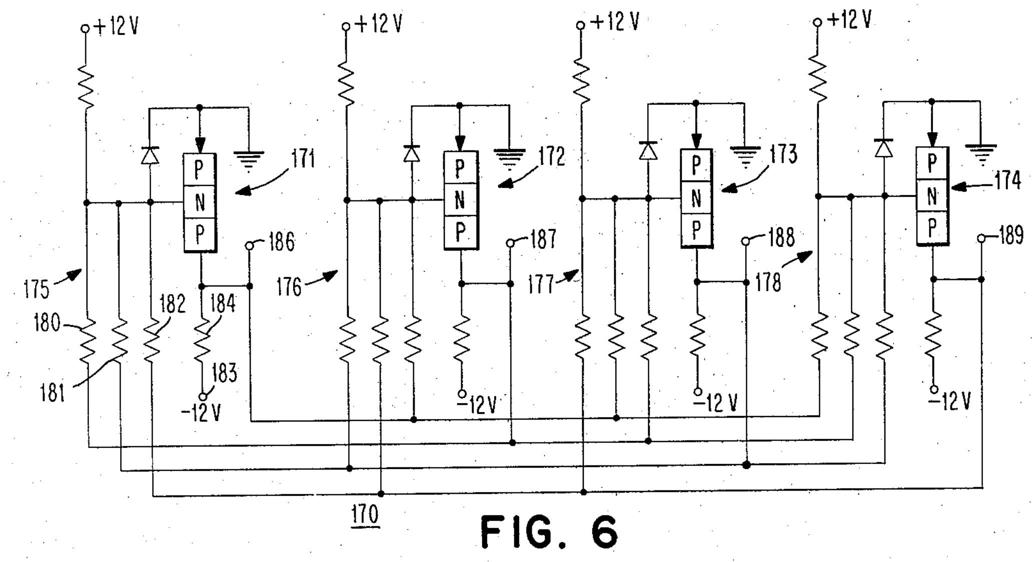
FIGS. 6 and 7 are schematic diagrams of an improved six-stable state circuit and two stages of an improved three-stable state shift register circuit, respectively.

FIG. 6 illustrates schematically a four-stage, six-stable device 170. The circuit 170 comprises inverters 171, 172, 173 and 174, the inputs of which are provided by threshold devices 175–178 inclusive. Each threshold device includes three inputs and the resistor elements are adjusted so that a threshold of two is provided. The threshold device 175 comprises three input resistors 180, 181 and 182, each of which may be 6200 ohms; and the collector of the inverter 171 is coupled to a negative potential terminal 183 by way of a resistor 184 which may be 2000 ohms. Corresponding resistors in the other stages will have the same values as resistors 180, 181, 182 and 184. Terminals 186–189 provide both input and output terminals of the multistable circuit 170. The various stable states of the circuit 170 are set forth in the table below. It is readily apparent in this example that either potential may be used to indicate a logic "1" or a logic 0 as desired.

| State of 170 | State of Each Inverter | | | |
|---|---|---|---|---|
| | 171 | 172 | 173 | 174 |
| 1 | 1 | 1 | 0 | 0 |
| 2 | 1 | 0 | 1 | 0 |
| 3 | 1 | 0 | 0 | 1 |
| 4 | 0 | 0 | 1 | 1 |
| 5 | 0 | 1 | 0 | 1 |
| 6 | 0 | 1 | 1 | 0 |

With ground potential applied to two inputs to a threshold device, the corresponding inverter is turned OFF and when a negative potential is applied to two of the inputs, the inverter is turned ON.

Figure 7:
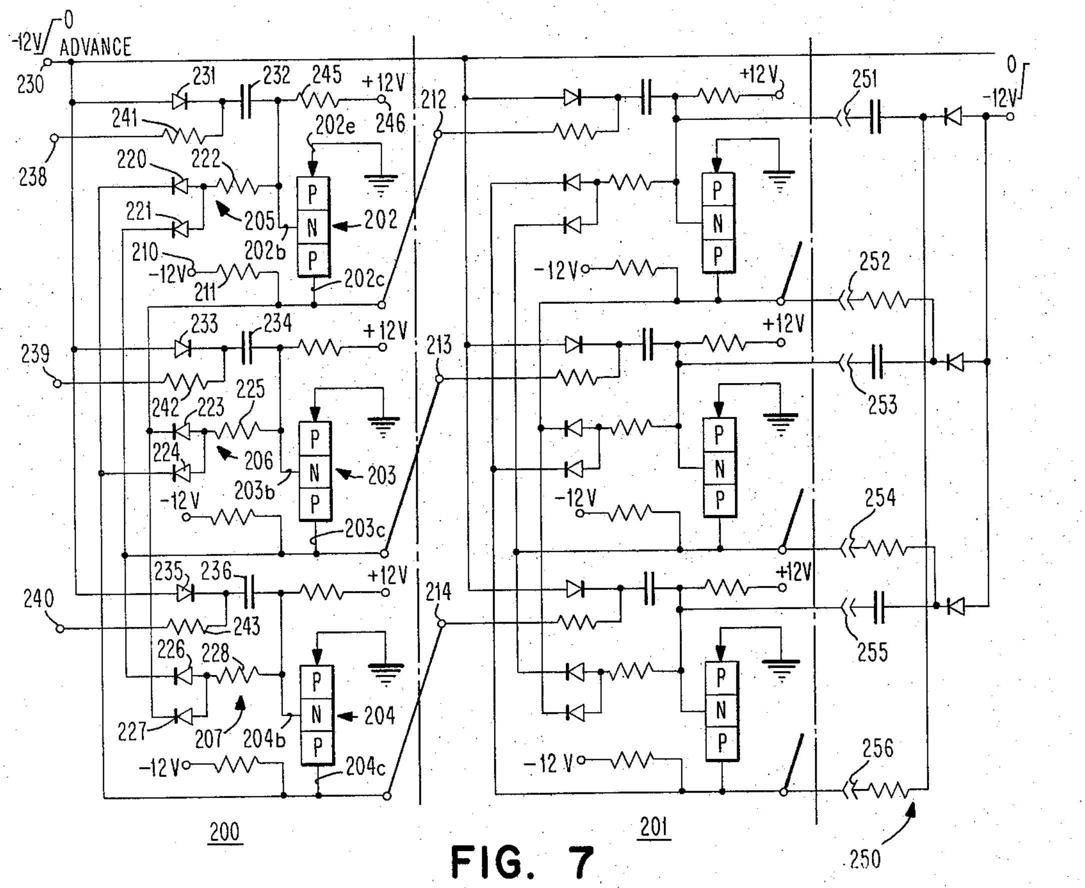

FIG. 7 discloses two stages, 200 and 201 of a shift register. Each stage is a three-stable state circuit. The shift register stage 200 comprises three inverters, 202, 203 and 204, with input threshold devices 205, 206 and 207. Each threshold device has two inputs cross-coupled to the outputs of the other two threshold devices. The threshold value T may be set equal to one by assigning a logic "1" to a negative 12 volt potential, or $T=2$ if logic "1" is assigned ground potential. Each stable state of the stage 200 is characterized by one inverter being cut off while the other two inverters are conducting.

The transistor inverter 202 has its emitter terminal 202*e* connected to ground potential and its collector terminal 202*c* connected to a negative potential terminal 210 by way of a load resistor 211. The collector terminal is also connected to the input terminal 212 of the shift register stage 201. Similarly, the collector outputs of the inverters 203 and 204 are connected to respective inputs 213 and 214 of the shift register stage 201.

The collector terminals 203*c* and 204*c* are coupled to the base terminal 202*b* of the inverter 202, by way of a pair of input diodes 220 and 221 and a resistor 222. In a similar manner, the collector terminals 202*c* and 204*c* are connected to the base terminal 203*b* by way of diodes 223 and 224 and a resistor 225. The collector terminals 202*c* and 203*c* are connected to the base terminal 204*b* by way of diodes 226 and 227 and the resistor 228. A negative potential from the collector circuit of a turned OFF inverter applied to the negative OR threshold inputs to the other inverters will turn the other inverters ON. Thus two inverters are ON and one OFF in each stable state of the stage 200.

Positive OR circuits of known design may be used in threshold devices 205, 206 and 207, in which case two transistors will be OFF and one ON during each stable state.

A source of advance pulses (not shown) applies a positive-going pulse to a shift input terminal 230 to transfer logical data from each stage of the shift register to the next succeeding stage. The terminal 230 is connected to the base terminal 220*b* by way of a diode 231 and a capacitor 232. Similarly, the terminal 230 is connected to the base terminals 203*b* and 204*b* by diode 233, capacitor 234 and diode 235, capacitor 236.

Data input terminals 238, 239 and 240 are connected respectively to the capacitors 232, 234 and 236 by resistors 241, 242 and 243. A bias resistor 245 connects the base terminal 202*b* to a positive supply terminal 246.

In operation, one of the data input terminals will have a negative potential applied thereto; and the other terminals, ground potential. A negative input potential at terminal 238 will charge the capacitor 232 negatively since a slightly negative or positive potential will exist at the base terminal 202*b* irrespective of the state of the inverter 202.

More specifically, if the inverter 202 is ON, the base-emitter junction clamps the base terminal $Ve-V_{be}$. If the inverter 202 is OFF, the base terminal is set slightly positive by the voltage divider extending from the supply terminal 246, through resistor 222, diodes 220 and 221, and the collector-emitter paths of transistors 204 and 203, to ground potential.

If ground potential is applied to the data input terminal 238, the capacitor 232 is not charged to any significant extent. When the positive-going advance pulse is applied to the terminal 230, a positive pulse is produced only by the capacitor 232, 234 or 236 which has been charged by existence of a negative potential at its data input terminal 238, 239 or 240. This positive pulse turns OFF or holds OFF the inverter to which the capacitor is connected and turns ON or holds ON the other two inverters.

In a similar manner, the inverter 202, 203 or 204, which is OFF when the advance pulse is received, will cause the corresponding inverter in stage 201 to be turned OFF or held OFF.

A second advance pulse circuit 250 is illustrated as being connectable to the register stage 201 by connectors 251–256. A circuit such as 250 may be connected to any stage wherein it is desired, for example, to read in or to read out data serially. This advance circuit is similar to that shown in FIG. 4 and will sequentially turn OFF succeeding inverters from top to bottom in response to successive advance pulses.

Typical component values for one application of the register stage 200 are:

| | |
|---|---|
| Resistor: | |
| 221 | 1K. |
| 222, 225, 228 | 8.2K. |
| 241, 242, 243 | 39K. |
| 245 | 62K, |
| Capacitors: | |
| 232, 234, 236 | 1500 picofarads. |

One of the important advantages of the multistable devices made in accordance with the teachings of the present invention is the elimination of the requirement for parity checking circuits in binary code storage device applications. For example, in FIG. 7, one inverter in stage 200 must be OFF and two ON in each stable state. Hence, the need for a check for one OFF and two ON is obviated.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A multistable circuit comprising
a plurality of threshold circuits greater in number than three, each threshold circuit having an output and a plurality of inputs equal in number to one less than the number of threshold circuits and having means producing an output signal of one polarity in response to input signals of like polarity applied to at least a predetermined number of inputs greater than one and less than the number of inputs, and
means for applying the output of each threshold circuit in logically inverted form to an input of each other threshold circuit, whereby the multistable circuit can assume any one of a predetermined number of direct current stable states greater than the number of threshold circuits.

2. A multistable circuit comprising
a plurality of threshold circuits greater in number than three, each threshold circuit having an output and a plurality of inputs equal in number to one less than the number of threshold circuits and having means producing an output signal of one polarity in response to input signals of like polarity applied to at least a predetermined number of inputs greater than one and less than the number of inputs, and
a plurality of inverters, each having an input coupled to the output of a respective threshold circuit and each having an output coupled to an input of each threshold circuit other than its respective threshold circuit,
whereby the multistable circuit can assume any one of a predetermined number of direct current stable states greater than the number of inverters.

3. A multistable circuit comprising
a plurality of threshold circuits greater in number than three, each threshold circuit having an output and a plurality of inputs equal in number to one less than the number of threshold circuits and having means producing an output signal of one polarity in response to input signals of like polarity applied to at least a predetermined minimum number of inputs greater than one and less than the number of inputs, and
a plurality of transistor inverters, each having an input coupled to the output of a respective threshold circuit and each having an output coupled to an input of each threshold circuit other than its respective threshold circuit,
whereby the multistable circuit can assume any one of a predetermined number of direct current stable states greater than the number of transistor inverters.

4. A direct current stable ring circuit comprising
a plurality of threshold circuits greater in number than three, each threshold circuit having an output and a plurality of inputs equal in number to one less than the number of threshold circuits and having means producing an output signal of one polarity in response to input signals of like polarity applied to at least a predetermined number of inputs greater than one and less than the number of inputs, means for applying the output of each threshold circuit in logically inverted form to an input of each other threshold circuit, and an input gate circuit for each threshold circuit including means for receiving advance pulses, and means controlled by the inverting means for changing the operating states thereof in a predetermined sequence in response to succeeding advance pulses.

5. A direct current stable ring circuit comprising a plurality of threshold circuits greater in number than three, each threshold circuit having an output and a plurality of inputs equal in number to one less than the number of threshold circuits and having means producing an output signal of one polarity in response to input signals of like polarity applied to at least a predetermined minimum number of inputs greater than one and less than the number of inputs, a plurality of transistor inverters, each having an input coupled to the output of a respective threshold circuit and each having an output coupled to an input of each threshold circuit other than its respective threshold circuit, and means for receiving advance pulses, and means controlled by the transistor inverters for changing the operating states thereof in a predetermined sequence in response to succeeding advance pulses.

6. A circuit having six direct current stable states comprising four transistors, each transistor having three resistor inputs and having one output coupled to an input of each other transistor, and circuit means for each transistor including the respective three inputs operating the tranistor in one state to produce an output signal of one polarity when two other transistors are operating in a predetermined second state to apply input signals of the opposite polarity to two of said respective three inputs, whereby two transistors are operated in the one state and two in the second state during each stable state of the circuit.

7. A ring circuit having ten direct current stable states comprising five transistor inverters, each having base and collector terminals, a plurality of threshold circuit means, each having four resistors coupled to the base terminal of a respective transistor and each resistor coupled to the collector terminal of one of the other transistors, for turning two transistors "ON" to produce output signals of one polarity when three transistors are "OFF" to apply input signals of the opposite polarity to the respective resistors which are coupled to the base terminals of said two transistors, an input line for receiving advance pulses, and an input gate circuit means for each transistor coupled to the input line and to predetermined inverters for changing the operating states of the inverters in a predetermined sequence.

8. A ring circuit having ten direct current stable states comprising five transistor inverters, each including base and collector terminals and each having two predetermined operating states, a plurality of threshold circuit means, each having four resistors coupled to the base terminal of a respective transistor and each resistor coupled to the collector terminal of one of the other transistors, and having means for operating two transistors in one state to produce output signals of one polarity when the other three transistors are in the other state to apply input signals of the opposite polarity to respective resistors coupled to the base terminals of said two transistors, an input line for receiving advance pulses, and an input gate circuit means for each transistor coupled to the input line and to predetermined inverters for changing the operating states of the inverters in a predetermined sequence.

9. A shift register for storing data in and $m$-out-of-$n$ code where $n$ is an integer greater than two comprising an input line for receiving advance pulses;

at least first and second stages, each stage including a plurality of transistors equal in number to $n$ and each having base, emitter and collector terminals, first means operating each transistor in a common emitter configuration, a threshold circuit for each transistor having an output coupled to the base terminal of its respective transistor and a plurality of inputs coupled to the collector terminals of the other transistors for operating a predetermined number of the transistors in one stable state of conduction and the other transistors in another stable state of conduction in accordance with the value of the threshold, and an input gate circuit for each transistor, each gate circuit including second means for receiving bivalued input signals, and third means for operating the respective transistor in accordance with the value of the input signal in response to each advance pulse; and each second means of the second stage being connected to a respective collector terminal of the first stage for transferring data from the first stage to the second stage.

10. A shift register for storing data in a one-out-of-$n$ code where $n$ is an integer greater than two comprising an input line for receiving advance pulses;

at least first and second stages, each stage having a plurality of direct current stable states equal in number to $n$ and including a plurality of transistors equal in number to $n$ and each having base, emitter and collector terminals, first means operating each transistor in a common emitter configuration, a diode threshold circuit for each transistor having an output coupled to the base terminal of its respective transistor and a plurality of inputs coupled to the collector terminals of the other transistors for operating one of the transistors in one stable state of conduction and the other transistors in another stable state of conduction, and an input gate circuit for each transistor including second means for receiving bivalued input signals, and third means for operating the respective transistor in accordance with the value of the input signal in response to each advance pulse; and each second means of the second stage being connected to a respective collector terminal of the first stage for transferring data from the first stage to the second stage.

11. A shift register comprising at least first and second stages, each stage having a plurality of stable states greater in number than two and including a plurality of transistors equal in number to the stable states and each having base, emitter and collector terminals;

means operating each transistor in a common emitter configuration;

a diode threshold circuit for each transistor having an output coupled to the base terminal of its respective transistor and having inputs, each coupled to the collector terminal of a respective one of the other transistors for switching all other transistors to one state when one transistor is held in another state of conduction; and an input gate circuit for each transistor, each including a resistor for receiving bivalued input signals, a diode receiving advance pulses, and a capacitor coupling the resistor and diode to the base terminal of the respective transistor to operate the transistor in accordance with the value of the input signal in response to each advance pulse; and means connecting the resistors of the second stage to respective collector terminals of the first stage for transferring data from the first stage to the second stage.

References Cited by the Examiner

UNITED STATES PATENTS

| | | | |
|---|---|---|---|
| 3,005,917 | 10/1961 | Hofmann | 328—49 |
| 3,079,513 | 2/1963 | Yokelson | 307—88.5 |

FOREIGN PATENTS

| | | |
|---|---|---|
| 1,238,543 | 7/1960 | France. |

ARTHUR GAUSS, *Primary Examiner.*

J. ZAZWORSKY, *Assistant Examiner.*